United States Patent [19]

Nash et al.

[11] Patent Number: 5,101,624
[45] Date of Patent: Apr. 7, 1992

[54] EXHAUST NOZZLE HINGE

[75] Inventors: Dudley O. Nash, Cincinnati; Stephen J. Szpunar, Westchester, both of Ohio

[73] Assignee: General Electric Company, Cincinnati, Ohio

[21] Appl. No.: 724,490

[22] Filed: Jun. 27, 1991

Related U.S. Application Data

[63] Continuation of Ser. No. 404,021, Sep. 7, 1989, abandoned.

[51] Int. Cl.⁵ ............... F02K 11/00; B64D 33/04
[52] U.S. Cl. ......................... 60/266; 239/127.1
[58] Field of Search ............... 60/228, 230, 266, 271, 60/39.83; 239/265.11, 265.19, 265.33, 265.35, 127.1, 127.3

[56] References Cited

U.S. PATENT DOCUMENTS

| | | | |
|---|---|---|---|
| 3,003,311 | 10/1961 | Hall | 239/127.1 |
| 3,979,065 | 9/1976 | Madden | 239/127.3 |
| 4,081,137 | 3/1978 | Sutton et al. | 239/127.3 |
| 4,544,098 | 10/1985 | Warburton | 239/127.3 |
| 4,690,329 | 9/1987 | Madden | 239/265.19 |
| 4,742,961 | 5/1988 | Starke | 239/127.3 |
| 4,747,542 | 5/1988 | Cires et al. | 239/127.3 |
| 5,016,818 | 5/1991 | Nash et al. | 239/127.1 |

FOREIGN PATENT DOCUMENTS

| | | |
|---|---|---|
| 1121413 | 1/1962 | Fed. Rep. of Germany ... 239/127.3 |
| 782493 | 9/1957 | United Kingdom . |
| 851085 | 10/1960 | United Kingdom . |
| 1519604 | 8/1978 | United Kingdom . |
| 2132279 | 7/1984 | United Kingdom . |

*Primary Examiner*—Richard A. Bertsch
*Assistant Examiner*—Howard R. Richman
*Attorney, Agent, or Firm*—Jerome C. Squillaro; David L. Narciso

[57] ABSTRACT

A hinge for pivotably connecting upstream and downstream wall sections of an exhaust nozzle of a gas turbine engine. Each wall section includes a liner spaced from the interior surface of the wall section to define respective first and second cooling air flow passages therebetween. One of the wall sections includes a curved end portion and the hinge includes a leaf seal which extends from the other wall section and biases against the curved end portion to form an air tight seal and define, at least in part, a plenum at the hinged connection of the wall sections. The plenum provides an air flow communication path between the first and second cooling air flow passages to transfer cooling air from the air flow passage of the upstream wall section to the air flow passage of the downstream wall section to thereby increase the efficiency of cooling of each of the wall sections.

27 Claims, 5 Drawing Sheets

EXHAUST NOZZLE HINGE

The invention described herein was made in the course of, or under, United States Department of the Air Force Contract No. F33657-83-C-0281. The United States Government has rights in this invention pursuant to said contract.

This application is a continuation of application Ser. No. 07/404,021, filed Sept. 7, 1989, now abandoned.

BACKGROUND OF THE INVENTION

1. Field of the Invention

The present invention relates to hinges for pivotably connecting axially adjacent upstream and downstream wall sections of a gas turbine engine exhaust nozzle, and particularly to a nozzle hinge having a novel configuration for transferring cooling air from the upstream wall section to the downstream wall section.

2. Description of the Related Art

Maneuverability of modern high performance aircraft is greatly enhanced by extending the role of the engine exhaust nozzle beyond its conventional jet accelerating function. An exhaust nozzle with jet deflection capability can produce more rapid aircraft maneuvers at lower flight speeds than can be achieved by conventional control surfaces. In addition, reverse thrust capability incorporated within the exhaust nozzle can enable the aircraft to decelerate very rapidly for in-flight maneuvering purposes, and also to decelerate on landing to reduce the landing roll for short field operation.

Figure 1:
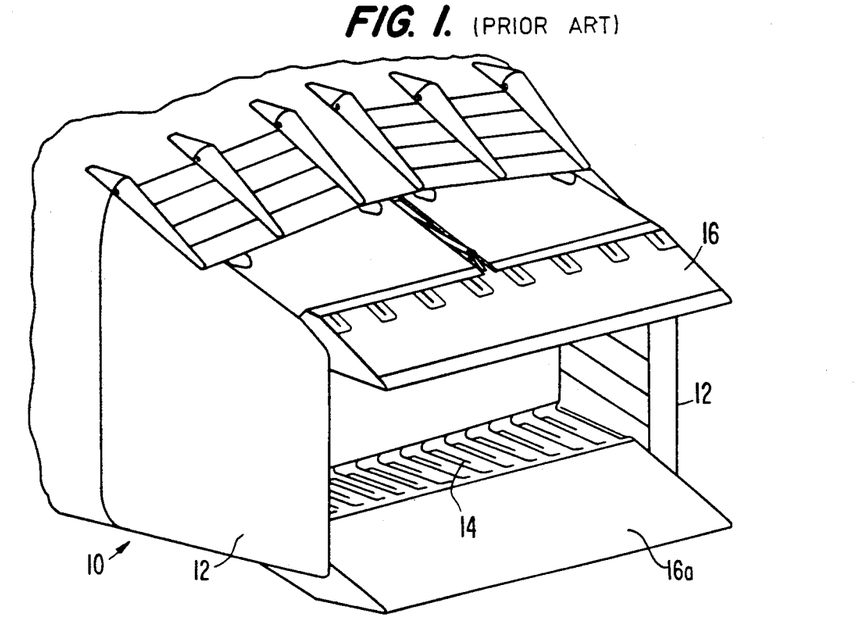
FIG. 1 is a perspective view of a typical two-dimensional converging/diverging exhaust nozzle.
Figure 2:
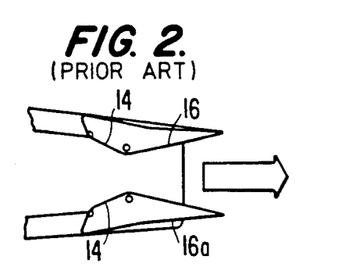
FIG. 2 is a schematic side view of the nozzle of FIG. 1 with the flaps of the nozzle positioned for full jet thrust.
Figure 3:
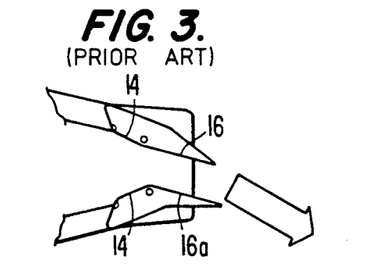
FIG. 3 is a schematic side view of the nozzle of FIG. 1 with the flaps of the nozzle deflected for pitch maneuvering of the aircraft.
Figure 4:
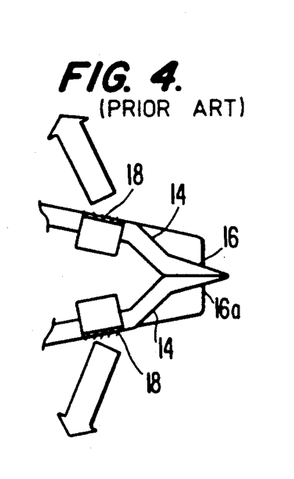
FIG. 4 is a schematic side view of the nozzle of FIG. 1 with the nozzle flaps in a closed position to direct the exhaust gases through auxiliary nozzles which provide reverse thrust for short field operations.

Exhaust nozzles capable of such additional functions are known as multi-function exhaust nozzles. A typical such exhaust nozzle 10 is illustrated in FIG. 1. Nozzle 10 is a two dimensional exhaust nozzle having wall sections comprised of side walls 12, upstream converging flaps 14, and downstream diverging flaps 16 and 16a disposed between side walls 12. Such two-dimensional nozzles are preferred for multi-function applications since, unlike round section, axisymmetric nozzles, flaps 16 and 16a may be actuated differentially to thereby deflect the stream of hot combustion gases exiting through the nozzle for rapid pitch maneuvering of the aircraft. Such differential actuation of flaps 16 and 16a is illustrated in FIG. 3. FIG. 2 illustrates the position of flaps 16 and 16a for normal thrust operation. FIG. 3 illustrates the deflected positions of flaps 16 and 16a for rapid pitch maneuvering of the aircraft. FIG. 4 illustrates a closed position of flaps 14, 16, and 16a wherein the hot combustion gases are discharged through auxiliary exhaust nozzles 18 to produce a reverse thrust.

Figure 5:
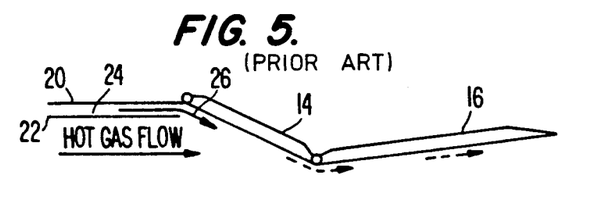
FIG. 5 is a schematic side view of a conventional film type cooling airflow configuration across convergent and divergent flaps of a two-dimensional exhaust nozzle.

Since the wall sections of the exhaust nozzles are exposed to extremely high temperatures from the stream of hot products of combustion exhausting through nozzle 10, it is preferable to cool the interior surfaces of the wall sections to extend the service life of the nozzle and reduce maintenance requirements. Typically, prior art nozzles utilized a surface cooling configuration for the wall sections of the nozzles as illustrated in FIG. 5. FIG. 5 schematically illustrates a portion of exhaust nozzle 10 including a casing section 20 positioned upstream of converging flap 14 in the hot gas flow path. Casing 20 includes a liner 22 spaced from the interior surface thereof. Cooling air, typically bypass air from the turbine engine, is injected into cooling air flow passage 24 between casing section 20 and liner 22. The cooling air is ejected from cooling air flow passage 24 along the interior surfaces of flaps 14 and 16 to provide a film of cooling air on the interior surfaces of those flaps as illustrated by the arrows in FIG. 5.

Figure 6:
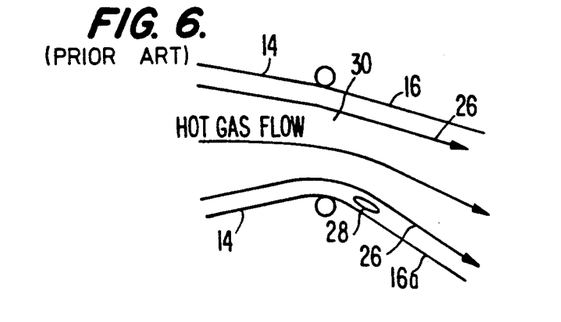
FIG. 6 is a schematic representation of the flow of film cooling air across the interior surfaces of the two-dimensional nozzle of FIG. 5 which illustrates the area of flow separation downstream of the hinge connection when the divergent and convergent flaps are deflected for pitch maneuvering of the aircraft.

However, the FIG. 5 configuration has significant drawbacks. First, the cooling air exiting from cooling air flow passage 24 is depleted as it flows along the surfaces of flaps 14, 16, and 16a by mixing with hot gases in the exhaust gas flow path. This depletion of the cooling air results in an excessive amount of cooling air flow being required to cool the flap sections 14, 16 and 16a. Excessive cooling air flow results in performance loss since the cooling air flow is typically taken from the turbine engine bypass air. Moreover, and with reference to FIG. 6, when flaps 14, 16, and 16a are deflected for pitch maneuvering of the aircraft, a severe angle exists at the junction of the convergent flaps 14 and divergent flaps 16 and 16a resulting in local flow separation 28 downstream of throat 30. Interior surfaces of flaps 16 and 16a, which depend on the conventional film of cooling air injected upstream of the flap for cooling, overheat since the turbulence in separated flow region 28 mixes the film of cooling air with hot gas flowing through the exhaust nozzle and thereby seriously diminishes the effectiveness of this type of cooling configuration.

Although the problem of cooling nozzle wall sections is equally applicable to axisymmetric nozzles as to multi-function, two-dimensional type exhaust nozzles, problems associated with cooling the rearmost, divergent nozzle flap on a multi-function two-dimensional type exhaust nozzle are magnified for two basic reasons. First, divergent flaps on two-dimensional type nozzles are longer for a given nozzle size and flow area than axisymmetric nozzle flaps and, thus, are more difficult to cool by the conventional method of injecting a film of cooling air at the flap hinge. The flaps of two-dimensional exhaust nozzles are longer than axisymmetric nozzle flaps since the side walls of the two-dimensional nozzle are fixed and the flap motion must therefore provide all of the required nozzle area variation. Two-dimensional nozzle flaps, the tips of which travel through a greater excursion to provide the required area variation, must necessarily be longer so that nozzle flap external contour angles are low as required for low drag and thus high performance of the aircraft.

Secondly, and in conjunction with the reasons noted above, during operation of a two-dimensional type exhaust nozzle with full jet deflection, a severe angle exists at the junction of the convergent and divergent flaps resulting in local flow separation downstream of the throat as described above with reference to FIG. 6.

In practice, two-dimensional exhaust nozzle flaps cooled by a film of cooling air injected at the hinge are subjected to excessive and nonuniform temperatures due to the general inefficiency of this type of film injected cooling flow. Such inefficiency has resulted in distortion, thermal fatigue, and cracking of the flap surface on some exhaust nozzles currently in operational service. Furthermore, as overall engine efficiency is increased in response to the ever present demand for improving fuel economy and range of the aircraft, the availability of bypass air for cooling the exhaust nozzle flaps is becoming increasingly scarce. To provide adequate temperature control of nozzle flaps on modern engines, a more efficient convection cooling means is required which, in general, can provide for more uniform distribution of cooling air over the wall sections of the nozzle.

Therefore, it is an object of the present invention to provide a hinge for pivotably connecting upstream and downstream exhaust nozzle wall sections wherein cooling air may be more efficiently transferred from the upstream to the downstream wall sections of the nozzle.

It is a further object of the present invention to provide a hinge connection for adjacent upstream and downstream wall sections of an exhaust nozzle which accommodates the use of liners disposed on the interior surfaces of the wall sections of the nozzle to define cooling air flow passages therebetween.

It is still a further object of the present invention to provide a hinge for adjacent upstream and downstream wall sections of a nozzle which is capable of more efficiently transferring cooling air along the upstream and downstream interior surfaces of the nozzle wall sections to thereby reduce the demand for cooling air flow resulting in increased performance and efficiency of the aircraft prime mover.

Additional objects and advantages of the invention will be set forth in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the foregoing objects, and in accordance with the purposes of the invention as embodied and broadly described herein, a hinge is provided for connecting a first wall section and a second wall section of a gas turbine engine exhaust nozzle and for allowing relative pivoting motion therebetween. The first and second wall sections each have an inside surface and a liner attached to and spaced apart from the inside surface for defining first and second cooling air flow passages therebetween. The hinge comprises a curved end portion having a curved surface formed at a first end of one of the first and second wall sections, and leaf seal means, fixedly attached to and extending from a first end of the other one of said first and second wall sections, for slidably bearing against the curved surface to form a substantially air-tight seal therebetween as the first and second wall sections pivot relative to one another. Plenum means, defined at least in part by the leaf seal means and the first end of the other one of the first and second wall sections, provides a flow communication between the first and second cooling air flow passages, and offset bracket means are provided for pivotably connecting the first and second wall sections at respective first ends of the wall sections.

Preferably, the first wall section is positioned upstream of the second wall section in the gas flow path through the exhaust nozzle and the curved surface is formed at the upstream end of the second wall section. The liner of the second wall section is then configured to include a curved upstream end portion spaced from the curved portion of the second wall section to define a portion of the cooling air flow passage of the second wall section. With such a configuration, the liner of the first wall section is configured with a downstream end portion terminating proximate to, spaced from, and in sealing engagement with the curved end portion of the liner of the second wall section. In this manner, as the first and second wall sections pivot relative to one another the curved upstream end portion of the liner of the second wall section follows and remains proximate to and in sealing engagement with the downstream end portion of the liner of the first wall section to maintain a continuous flow path from the first cooling air flow passage, through the plenum means, to the second cooling air flow passage without significant leaks therethrough.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Reference will now be made in detail to the present preferred embodiment of the invention as illustrated in the accompanying drawings. It is here noted that the present invention is equally applicable to axisymmetric type exhaust nozzles as to multi-function, two-dimensional exhaust nozzles hereinbefore described. However, for purposes of describing the present preferred embodiment of the invention, and not by way of limitation, the description below is directed primarily to a hinge incorporating the teachings of the present invention which connects first and second wall sections of a two-dimensional type exhaust nozzle. Furthermore, while a plurality of hinges of the present invention may be incorporated in a given exhaust nozzle to connect the various pivoting wall sections, each hinge would have substantially the same configuration, thus, only one such hinge is described hereinbelow. It will be apparent to those skilled in the art that the description of the hinge connection for pivoting wall sections of the two-dimensional nozzle is equally applicable to connections of wall sections of an axisymmetric type nozzle and other variations on multifunction type exhaust nozzles.

Figure 7:
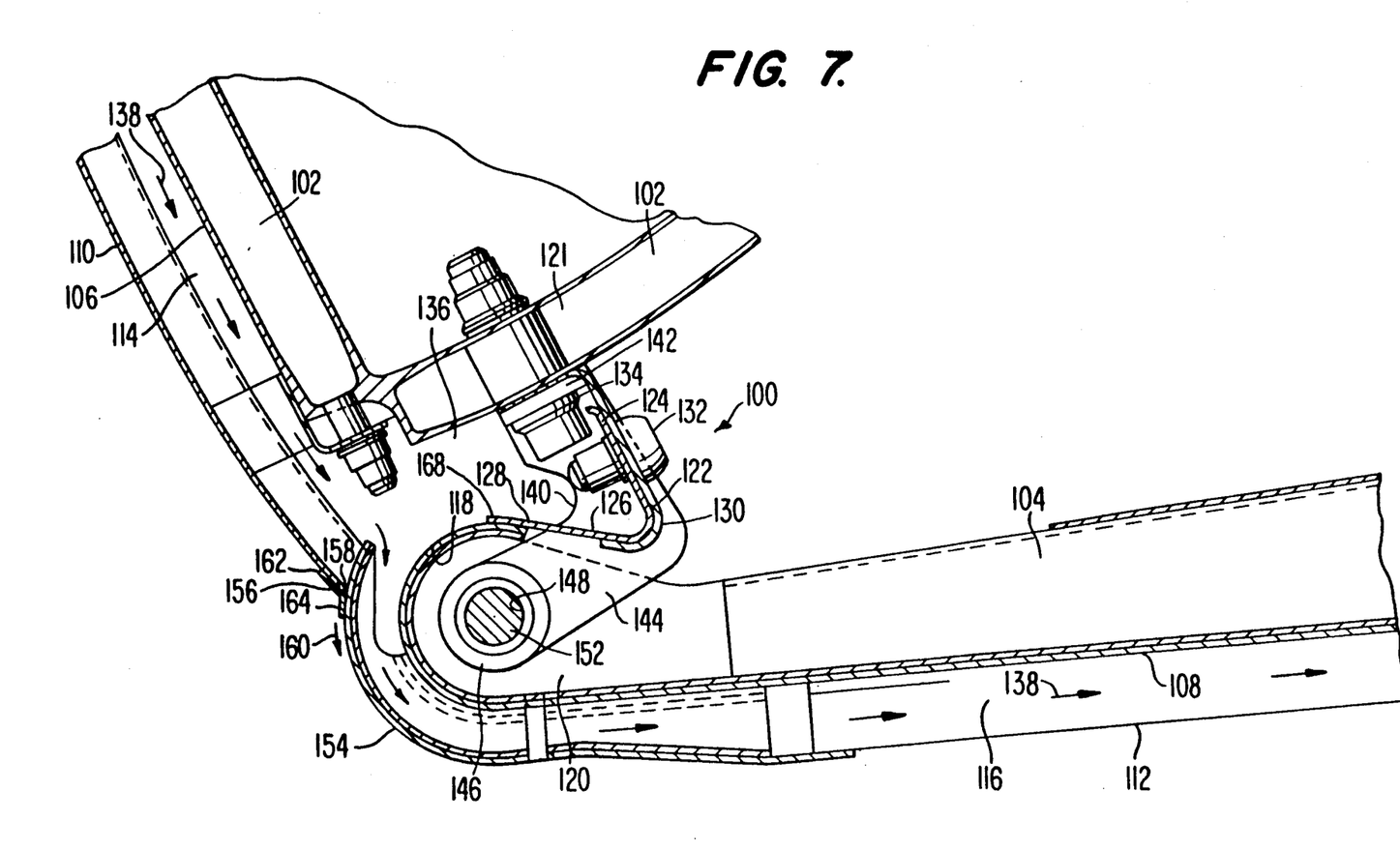
FIG. 7 is a detailed side view of an exhaust nozzle hinge incorporating the teachings of the present invention wherein the wall sections of the nozzle are fully closed for reverse thrust operation.
Figure 8:
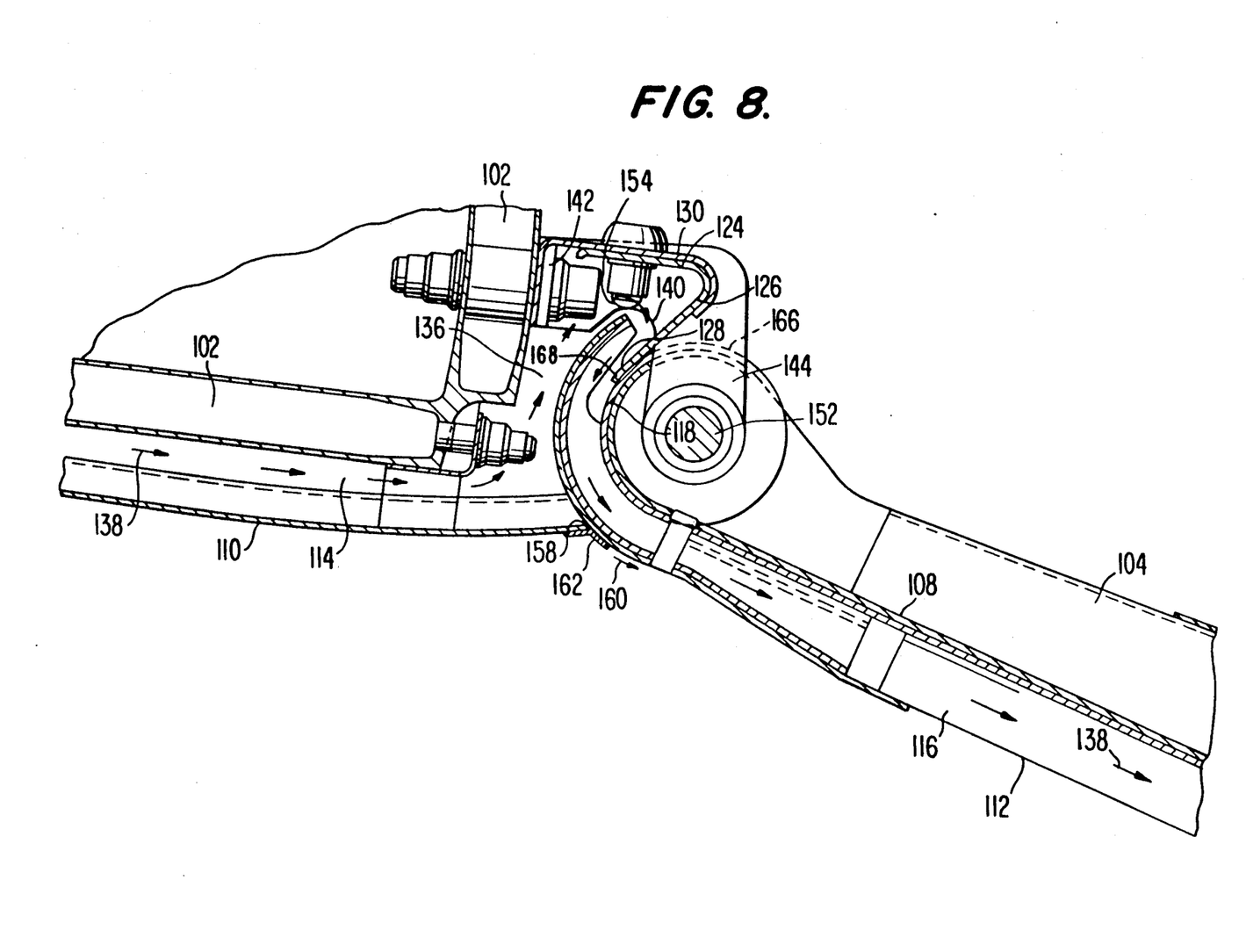
FIG. 8 is a detailed side view of the exhaust nozzle hinge of FIG. 7 wherein the wall sections of the nozzle are positioned for deflection of the exhaust gas flow path for pitch maneuvering of the aircraft.

In accordance with the present invention, a hinge means is provided for connecting a first wall section and a second wall section of an exhaust nozzle. As embodied herein, and as illustrated in FIGS. 7 and 8, the hinge means includes a hinge generally referred to as 100. Hinge 100 connects a first wall section 102 and a second wall section 104 and allows relative pivoting motion between first wall section 102 and second wall section 104. First and second wall sections 102 and 104 each have an inside surface 106 and 108, respectively. Wall sections 102 and 104 further include liners 110 and 112, respectively, spaced from inside surfaces 106 and 108 to define cooling air flow passages 114 and 116 therebetween.

In accordance with the present invention, the hinge comprises a curved portion formed at a first end of one of the first and second wall sections. In the preferred embodiment of the present invention illustrated in FIGS. 7 and 8, curved portion 118 is formed at a first end 120 of second wall section 104.

In accordance with the present invention, the hinge further includes seal means for forming a substantially air tight seal between the curved portion of the second wall section and a first end of the first wall section as the first and second wall sections pivot relative to one another. Preferably, the seal means comprises a leaf seal means, fixedly attached to and extending from one of the wall sections, for slidably bearing against the other wall section to form a substantially airtight seal therebetween as the first and second wall sections pivot relative to one another. As embodied and illustrated in FIG. 7, the leaf seal means is fixedly attached to a first end 121 of wall section 102 and includes leaf seal 122 having a root portion 124 and a biasing portion 126 cantilevered from root portion 124. Biasing portion 126 includes a distal end portion 128. Root portion 124 of leaf seal 122 is attached to first end 121 of wall section 102 via a bracket 130. Root portion 124 is firmly fixed to bracket 130 by a bolted connection 132. Alternatively, root portion 124 may be attached to bracket 130 by welding or any other fastening means. Bracket 130 is in turn fixedly attached to wall section 102 by a bolted connection 134. Bracket 130 is of course not limited to being connected to wall section 102 by bolt 134 and may also be welded to wall section 102 or attached by any other known fastening means. Alternatively, root portion 124 may be fixedly attached directly to wall section 102. In the present preferred embodiment bracket 130 serves to position and support biasing portion 126 of leaf seal 122 in the desired position as will be discussed hereinafter.

With the configuration of leaf seal 122 and bracket 130 as shown in FIGS. 7 and 8, the distal end 128 of biasing portion 126 conforms to, and slidably bears against, curved portion 118 of second wall section 104 as wall sections 102 and 104 pivot relative to one another thereby forming an airtight seal between biasing portion 126 and curved portion 118.

In accordance with the present invention, the hinge further includes plenum means, defined at least in part by the leaf seal means and a first end of one wall section, for flow communicating the first and second cooling air flow passages. As embodied herein, and as shown in FIGS. 7 and 8, the plenum means comprises a plenum 136 defined at least in part by first end 121 of wall section 102 and leaf seal 122. Each of wall sections 102 and 104 have a width along respective first ends 120 and 121 thereof substantially commensurate with one another. Liners 110 and 112 also have a width substantially commensurate with the widths of wall sections 102 and 104. Plenum 136 extends along substantially the entire width of first ends 120 and 121 of first and second wall sections 102 and 104, respectively, to form a continuous air flow path between first cooling air flow passage 114 and second cooling air flow passage 116 through plenum 136 along substantially the entire width of wall sections 102 and 104. The airflow path of cooling air through the cooling air flow passages and plenum is illustrated in FIG. 7 with arrows 138. Thus, since plenum 136 connects cooling air flow passages 114 and 116 along substantially the entire width of wall sections 102 and 104, uniform flow of cooling air through the plenum and along the wall sections is obtained without mixing with the hot exhaust gases exiting through the nozzle.

Figure 9:
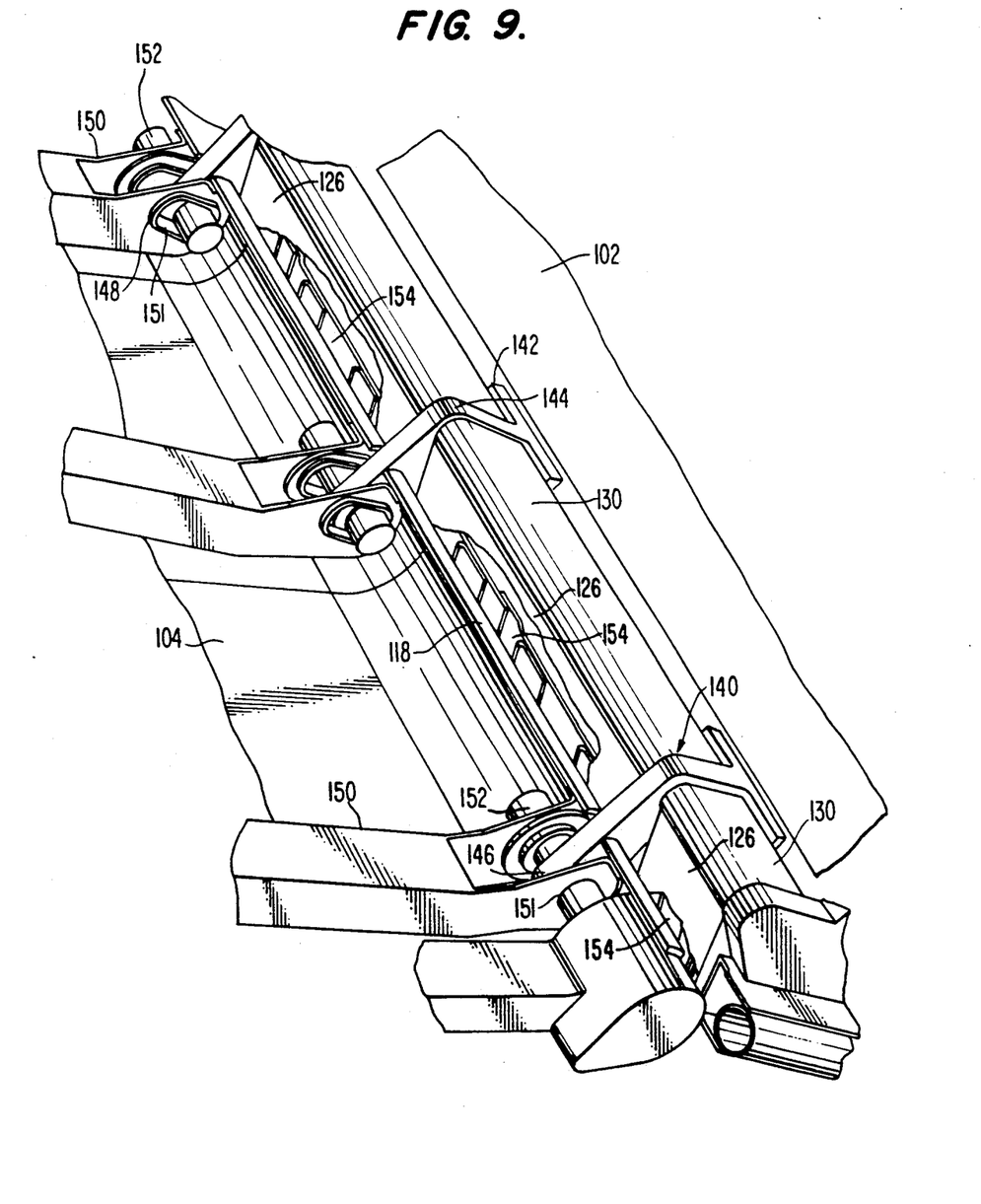
FIG. 9 is a partial isometric view of the exhaust nozzle hinge of FIG. 7 illustrating the pivoting bracket connection of the wall sections of the nozzle.
Figure 11:
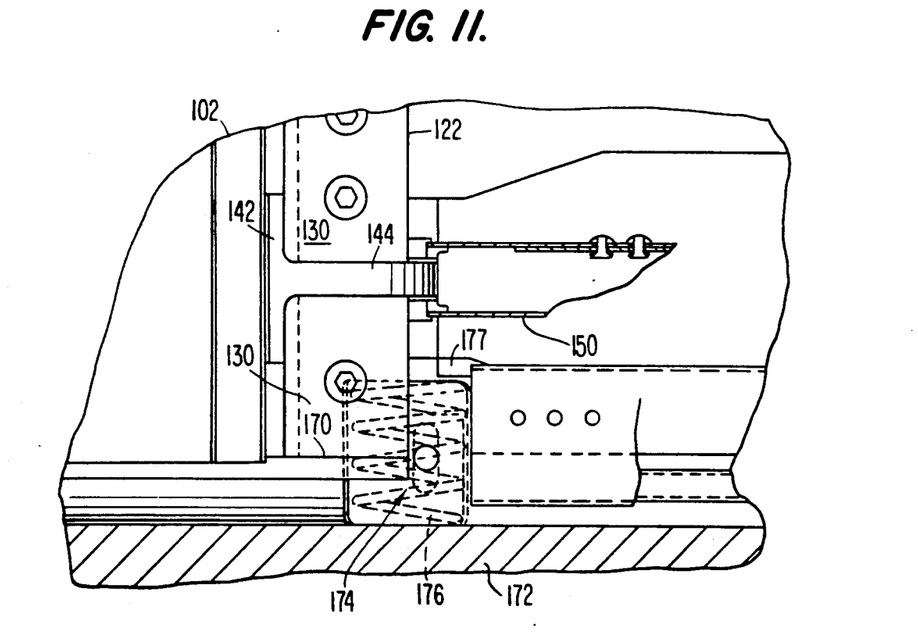
FIG. 11 is a partial top view of the exhaust nozzle hinge of FIG. 7.

In accordance with the present invention, the hinge further includes offset bracket means for pivotably connecting the first and second wall sections at respective first ends thereof. As embodied herein, the offset bracket means includes at least two brackets 140. With reference to FIGS. 9 and 11, bracket 140 includes a base portion 142 and an arm portion 144 extending from base portion 142. Base portion 142 is fixedly attached to first end 121 of wall section 102 by welding or by any other suitable fastening means. Each of the at least two brackets 140 are spaced from one another along the width of first end 121 of wall section 102. Arm portion 144 of bracket 140 includes a distal end portion 146 having an aperture 148. Distal end portions 146 of each bracket are thus offset by the length of arm portion 144 from wall section 102. In this manner the brackets 140 provide a configuration for pivotably connecting the first and second wall sections while stepping over curved end portion 118 as discussed below.

Ribs 150 are fixedly attached to wall section 104 proximate first end 120 by welding, for example. Each pair of ribs 150 are spaced to receive distal end portion 146 of bracket 140 therein and includes apertures 151 which align with aperture 148 when distal end portion 146 is received between ribs 150. Wall section 104 is pivotably attached to distal end 146 of arm portion 144 by means of pins 152 which extend through aperture 148 of bracket 140 and apertures 151 of ribs 150 to connect wall sections 102 and 104 in an assembled state.

The configuration of the offset bracket means permits wall sections 102 and 104 to pivot relative to one another to different angular orientations in accordance with the operating condition of the nozzle while stepping over curved portion 118 of wall section 104. In this manner, curved portion 118 remains spaced from first end 121 of wall section 102 to partially define plenum 136. Moreover, while FIG. 9 illustrates at least two brackets 140, each is substantially identical in construction, thus, only one has been described above. Furthermore, any number of brackets 140 may be arranged along the first ends of wall sections 102 and 104 to pivotably connect the wall sections in the assembled state and securely support the same. The present invention is not limited to the specific configuration of the bracket 140 shown and described and numerous other configurations for the offset bracket means will be envisioned by those skilled in the art while remaining within the scope of the present invention.

With reference to FIGS. 7 and 8, liner 112 of wall section 104 includes a curved upstream end portion 154 spaced from curved portion 118 of second wall section 104 to thereby define the upstream-most portion of cooling air flow passage 116. Liner 110 includes a downstream end portion 156 terminating proximate to and spaced from curved end portion 154 of liner 112 to define an airflow path 158 therebetween.

Airflow path 158 between curved upstream end portion 154 of liner 112 and downstream end portion 156 of liner 110 may be dimensioned to control the amount of coolant air leakage from plenum 136 and to eject a thin film of cooling air along the surface of liner 112 as indicated by arrow 160. Alternatively, hinge 100 may be configured with a means for sealing airflow path 158. As embodied herein, the sealing means may incorporate a leaf spring 162 fixedly attached to downstream end portion 156 of liner 110 wherein a leaf 164 of leaf spring 162 is configured to bias against curved upstream end portion 154 of liner 112 to thereby seal airflow gap 158.

Curved portion 118 of wall section 104 includes at least two notched portions 166 illustrated by dotted lines in FIG. 8. Notched portions 166 are spaced from one another along the width of wall section 112 to correspond to arm portions 144 of brackets 148. Arm portions 144 are movable into and out of notched portions 166 of curved portion 118 as first and second wall sections 102 and 104 pivot relative to one another about the offset bracket means. When wall sections 102 and 104 are positioned relative to one another such that the exhaust nozzle is in a fully deflected configuration as shown in FIG. 3, curved upstream end portion 154 of liner 112 extends upward into plenum 136 and arm portions 144 move into notched portions 166. In this position the flow path of cooling air through air flow passage 114 is into plenum 136 and then around the end of curved upstream end portion 154 and back down and into cooling air flow passage 116 as again illustrated by arrows 138.

With reference to FIGS. 8 and 9, leaf seals 122 extend along the width of wall sections 102 and 104 and are interrupted by brackets 140 spaced across the width of wall section 102. In this manner leaf seals 122 do not interfere with brackets 140 as wall sections 102 and 104 pivot relative to one another. To control leakage from plenum 136 through notched portions 166, local appendages 168 ar attached to distal end 128 of cantilevered portion 126 of each leaf seal to bridge notch portions 166 and seal plenum 136 as first and second wall sections 102 and 104 pivot about the offset bracket means to progressively larger angles therebetween. In this manner, potential leakage loss of cooling air from plenum 136 is minimized by sealing notch portions 166 with appendages 168 as the wall sections pivot relative to one another and curved end portion 118 of wall section 104 for each of the angular orientations of the wall sections. Similarly, leakage through air gap 158 between downstream end portion 156 of liner 110 and curved upstream end portion 154 of liner 112 may be minimized by incorporation of leaf spring 162 across gap 158.

Figure 10:
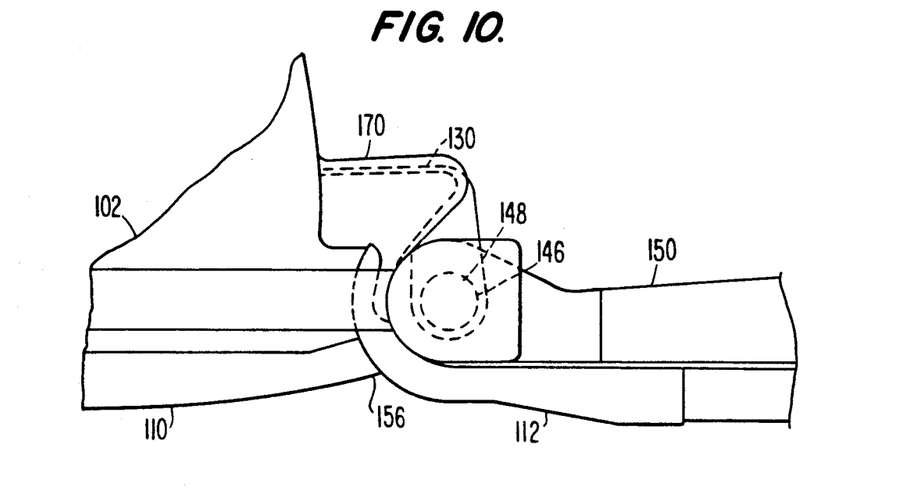
FIG. 10 is a partial side view of the exhaust nozzle hinge of FIG. 7.

A third potential leakage point of cooling air from plenum 136 exists at the endmost connections of wall section 102 and 104 where these endmost connections abut adjoining wall sections. To minimize leakage of cooling air from the distal ends of plenum 136, an end cap 170 is attached to each distal edge of the first end 121 of wall section 102, as illustrated in FIGS. 9 and 10, to seal plenum 136 at the ends thereof. End cap 170 fits closely with the end of leaf seal 122 and bracket 130 to minimize loss of coolant air flow between the mating surfaces thereof. To control leakage at the interface of wall sections 102 and 104 and a side wall 172 of the nozzle, a cylindrical seal 174 is inserted in each endmost portion of the curved portion 118 of wall section 104. A spring 176 may be inserted within each cylindrical seal 174 to bias against an abutment 177 and urge each cylindrical seal towards a respective side wall 172 of the nozzle. Here again, since the end caps 170 and associated cylindrical seals 174 disposed at each outermost edge of wall sections 102 and 104 are substantially identical in construction, only one edge configuration is illustrated and described herein.

Figure 12:
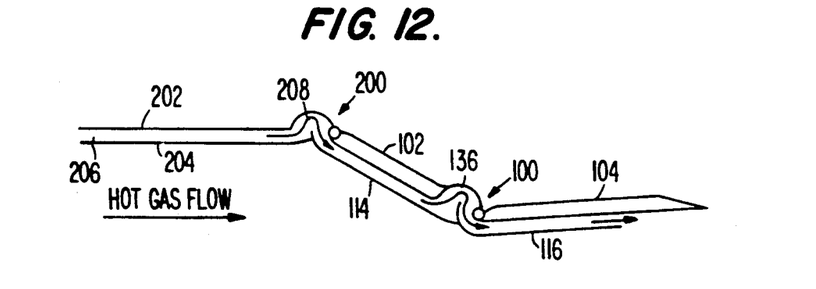
FIG. 12 is a schematic representation of a portion of an exhaust nozzle wherein hinges incorporating the teachings of the present invention are incorporated at the connection of convergent and divergent flaps and at the connection of the convergent flap with the nozzle casing.

In the preferred embodiment of the present invention described hereinabove, wall section 104 comprises a diverging flap of a two-dimensional exhaust nozzle and wall section 102 comprises a converging flap of the exhaust nozzle. The converging flap 102 is positioned upstream of diverging flap 104 in the exhaust gas flow path through the nozzle. Liners 110 and 112 of converging and diverging flaps 102 and 104 define a portion of the gas flow path through the nozzle. However, the present invention is not limited to use at the connection between converging and diverging flaps of a two-dimensional nozzle. Alternatively, as illustrated schematically in FIG. 12, the teachings of the present invention may be incorporated at a hinge connection between a nozzle casing section and the converging wall section, such as in hinge connection 200 between nozzle casing section 202 and converging wall section 102. A liner 204 is spaced from casing section 202 to define a cooling air flow passage 206 therebetween. In this embodiment, cooling air flowing through passage 206 arrives in plenum 208 at hinge connection 200 and from plenum 208 passes into cooling air flow passage 114 along substantially the entire width of convergent wall section 102 and into plenum 136 of hinge 100. From plenum 136 cooling air flows into cooling air flow passage 116 of divergent wall section 104. Thus the present invention may be incorporated at each pivotable connection of respective wall sections defining the exhaust nozzle gas flow path.

Furthermore, the preferred embodiment of the present invention has been described hereinabove with curved portion 118 formed at first end 120 of wall section 104 and with the leaf seal means fixedly attached to and extending from first end 121 of wall section 102. However it is well within the scope of the present invention that the curved portion be formed at first end 121 of wall section 102 with the leaf seal means and the offset bracket means extending from first end 120 of wall section 104. With such an arrangement the plenum means is still defined at least in part by the leaf seal means and the first end of one of the wall sections, and cooling air flow is directed from cooling air flow passage 114 into plenum 136 and therefrom into cooling air flow passage 116.

The present invention provides a novel configuration of an exhaust nozzle hinge capable of transferring cooling air flow from an upstream cooling air flow passage defined by a liner spaced from the upstream wall section, to a downstream cooling air flow passage defined by a liner spaced from the downstream wall section. This arrangement allows for more efficient use of cooling air passing through the cooling air flow passages and is particularly applicable to two-dimensional exhaust nozzles wherein the diverging flaps are of relatively long length. Through use of the present invention avoidance of thermal distortion and fatigue, and generally improved maintainability of the wall sections of the exhaust nozzle may be obtained.

Additional advantages and modifications will readily occur to those skilled in the art. The invention in its broadest aspects is, therefore, not limited to the specific details, representative apparatus and illustrative examples shown and described. Accordingly, departures may be made from such details without departing from the spirit or scope of the applicants, inventive concept.

What is claimed is:

1. A hinge for axially connecting a first wall section and a second wall section of a gas turbine engine two-dimensional, non axisymmetric exhaust nozzle and for allowing relative pivoting motion therebetween, said first and second wall sections each having an inside surface and a liner attached to and spaced from a respective one of said inside surfaces for defining first and second cooling air flow passages therebetween, comprising:
   a curved portion formed at a first end of one of said first and second wall sections;
   leaf seal means, fixedly attached to and extending from a first end of the other one of said first and second wall sections, for slidably bearing against said curved portion to form a substantially air-tight seal therebetween as said first and second wall sections pivot relative to one another;
   plenum means, defined at least in part by said leaf seal means and said first end of said other one of the first and second wall sections, for flow communicating said first and said second cooling air flow passages; and
   offset bracket means for pivotably connecting said first and second wall sections at said respective first ends thereof.

2. The hinge of claim 1 wherein said first and second wall sections comprise a converging flap and a diverging flap, respectively, of said exhaust nozzle and said liners spaced from said inside surfaces thereof define a portion of a gas flow path through said nozzle, said converging section being positioned upstream of said diverging section in said gas flow path.

3. The hinge of claim 1, wherein said first and second wall sections of said nozzle comprise a casing section and a converging flap, respectively, of said exhaust nozzle and said liners spaced from said inside surfaces thereof define a portion of a gas flow path through said nozzle, said casing section being positioned upstream of said converging section in said gas flow path.

4. The hinge of claim 1, wherein said liners of said first and second wall sections define a portion of a gas flow path through said nozzle, said first wall section being positioned upstream of said second wall section in said gas flow path and said curved portion being formed at the upstream end of said second wall section.

5. The hinge of claim 4, wherein said liner of said second wall section includes a curved upstream end portion spaced from said curved portion of said second wall section to define a portion of the respective cooling air flow passage.

6. The hinge of claim 5, wherein said liner of said first wall section includes a downstream end portion terminating proximate to and spaced from said curved end portion of said liner of said second wall section to define an air flow path therebetween.

7. The hinge of claim 6 including means for sealing said air flow path between the downstream end portion of said liner of said first wall section and the upstream curved portion of said liner of said second wall section.

8. The hinge of claim 1, wherein said offset bracket means includes at least two brackets each having a base portion, fixedly secured to and spaced from one another on said first end of said other one of the first and second wall sections, and an arm portion extending from said base portion and having a distal end thereof, said one of the first and second wall sections being pivotably attached to said distal end of each said arm portion.

9. The hinge of claim 1, wherein said first and second wall sections have a width along respective first ends thereof substantially commensurate with one another, and said plenum means and said liners extend along substantially the entire width of said first ends of said first and second wall sections to form a continuous air flow path between said first and second cooling air flow passages along said width, and further including means for sealing said plenum means at the distal ends thereof.

10. The hinge of claim 19, wherein said first and second wall sections comprise convergent and divergent flap sections, respectively, disposed between and adjacent to sidewall sections of a two-dimensional exhaust nozzle, and said means for sealing the distal ends of said plenum means includes:
   end caps attached to the distal edges of said first end of said other one of the convergent and divergent flaps to seal said plenum means at the ends thereof;
   a pair of cylindrical seals dimensioned to slidably fit within respective endmost portions of said curved portion of said one of the convergent and divergent flaps; and
   spring means for biasing said pair of cylindrical seals toward said sidewall sections of said nozzle.

11. A gas turbine engine having a nozzle defining an exhaust gas flow path, comprising:
   a plurality of pairs of upstream and downstream nozzle wall sections each having a substantially commensurate width at a first end thereof and an inside surface, and each wall section further including a liner spaced from respective ones of said inside surfaces to define cooling air flow passages therebetween;
   hinge means for pivotably connecting respective ones of said pairs of wall sections at respective first ends thereof, said hinge means including:
   a curved portion formed at said first end of one of said upstream and downstream wall sections of each said pair;
   leaf seal means, fixedly attached to and extending from said first end of the other one of each said pair of upstream and downstream wall sections, for slidably bearing against said curved portion to form a substantially air-tight seal therebetween as said upstream and downstream wall sections pivot relative to one another;

plenum means, defined at least in part by said leaf seal means and said first end of said other of the upstream and downstream wall sections, for flow communicating said first and said second cooling air flow passages; and offset bracket means for pivotably connecting each said pair of upstream and downstream wall sections at said respective first ends thereof.

12. The engine of claim 11, wherein said liner of said one of the upstream and downstream wall sections includes a curved end portion spaced from said curved portion to define a portion of the respective cooling air flow passage.

13. The engine of claim 12, wherein said liner of said other one of the upstream and downstream wall sections includes an end portion terminating proximate to and spaced from said curved end portion of said liner of said one wall section to define an air flow path therebetween.

14. The engine of claim 13 including means for sealing said air flow path between the downstream end portion of said liner of said other one of the upstream and downstream wall sections and the upstream curved portion of said liner of said one of the upstream and downstream wall sections.

15. The engine of claim 11, wherein said offset bracket means includes at least two brackets each having a base portion, fixedly secured to and spaced from one another on said first end of said other one of the upstream and downstream wall sections, and an arm portion extending from said base portion and having a distal end thereof, said one of the upstream and downstream wall sections being pivotably attached to said distal end of each said arm portion.

16. The engine of claim 11, wherein said plenum means and said liners extend along substantially the entire width of said first ends of said upstream and downstream wall sections to form a continuous air flow path between said first and second cooling air flow passages along said width, and further including means for sealing said plenum means at the distal ends thereof.

17. The engine of claim 11, including a source of cooling air and means for directing the cooling air into said cooling air flow passage of the upstream wall section.

18. A hinge for axially connecting a first wall section and a second wall section of a gas turbine engine exhaust nozzle and for allowing relative pivoting motion therebetween, said first and second wall sections each having an inside surface and a liner attached to and spaced from a respective one of said inside surfaces for defining first and second cooling air flow passages therebetween, comprising:

a curved portion formed at a first end of one of said first and second wall sections;

seal means for forming a substantially air-tight seal between said curved portion of said one wall section and a first end of the other one of said first and second wall sections as said first and second wall sections pivot relative to one another;

plenum means, defined at least in part by said seal means and said first end of said other one of the first and second wall sections, for flow communicating said first and said second cooling air flow passages; and offset bracket means for pivotably connecting said first and second wall sections at said respective first ends thereof.

19. A hinge for axially connecting a first wall section and a second wall section of a gas turbine engine exhaust nozzle and for allowing relative pivoting motion therebetween, said first and second wall sections each having an inside surface and a liner attached to and spaced from a respective one of said inside surfaces for defining first and second cooling air flow passages therebetween, comprising:

a curved portion force at a first end of one of said first and second wall sections;

leaf seal means, fixedly attached to and extending from a first end of the other one of said first and second wall sections, for slidably bearing against said curved portion to form, a substantially air-tight seal therebetween as said first and second wall sections pivot relative to one another;

plenum means, defined at least in part by said leaf seal means and said first end of said other one of the first and second wall sections, for flow communicating said first and said second cooling air flow passages; and offset bracket means for pivotably connecting said first and second wall sections at said respective first ends thereof, wherein said offset bracket means includes at least two brackets each having a base portion, fixedly secured to and spaced from one another on said first end of said other one of the first and second wall sections, and an arm portion extending from said base portion and having a distal end thereof, said one of the first and second wall sections being pivotably attached to said distal end of each said arm portion.

20. The hinge of claim 19, wherein said seal means includes at least one leaf seal having a root portion, said root portion being fixedly attached to said other one of the first and second wall sections and extending between said arm portions of said brackets, and a biasing portion cantilevered from a distal end of said root portion, said biasing portion being configured along at least a portion thereof to conform to and slidably bear against said curved portion as said first and second wall sections pivot relative to one another.

21. The hinge of claim 20, wherein said curved portion of said one of the first and second wall sections includes at least two notched portions spaced from one another to correspond to said arm portions of each of said at least two brackets, said arm portions being movable into and out of said notched portions as said first and second wall sections pivot relative to one another about said offset bracket means.

22. The hinge of claim 21, wherein said leaf seal means includes appendages attached to a distal end of said cantilevered portion of said at least one leaf seal to bridge said notch portions of said curved portion and seal said plenum means as said first and second wall sections pivot about said offset bracket means to progressively larger angles therebetween.

23. A hinge for axially connecting a first wall section and a second wall section of a gas turbine engine exhaust nozzle and for allowing relative pivoting motion therebetween, said first and second wall sections each having an inside surface and a liner attached to and spaced from a respective one of said inside surfaces for defining first and second cooling air flow passages therebetween, comprising:
- a curved portion formed at a first end of one of said first and second wall sections;
- leaf seal means, fixedly attached to and extending from a first end of the other one of said first and second wall sections, for slidably bearing against said curved portion to form, a substantially air-tight seal therebetween as said first and second wall sections pivot relative to one another;
- plenum means, defined at least in part by said leaf seal means and said first end of said other one of the first and second wall sections, for flow communicating said first and said second cooling air flow passages; and
- offset bracket means for pivotably connecting said first and second wall sections at said respective first ends thereof, and
- wherein said first and second wall sections have a width along respective first ends thereof substantially commensurate with one another, and said plenum means and said liners extend along substantially the entire width of said first ends of said first and second wall sections to form a continuous air flow path between said first and second cooling air flow passages along said width, and further including means for sealing said plenum means at the distal ends thereof, and
- wherein said first and second wall sections comprise convergent and divergent flap sections, respectively, disposed between and adjacent to sidewall sections of a two-dimensional exhaust nozzle, and said means for sealing the distal ends of said plenum means includes:
- end caps attached to the distal edges of said first end of said other one of the convergent and divergent flaps to seal said plenum means at the ends thereof;
- a pair of cylindrical seals dimensioned to slidably fit within respective endmost portions of said curved portion of said one of the convergent and divergent flaps; and
- spring means for biasing said pair of cylindrical seals toward said sidewall sections of said nozzle.

24. A gas turbine engine having a nozzle defining an exhaust gas flow path, comprising:
- a plurality of pairs of upstream and downstream nozzle wall sections each having a substantially commensurate width at a first end thereof and an inside surface, and each wall section further including a liner spaced from respective ones of said inside surfaces to define cooling air flow passages therebetween;
- hinge means for pivotably connecting respective ones of said pairs of wall sections at respective first ends thereof, said hinge means including:
- a curved portion formed at said first end of one of said upstream and downstream wall sections of each said pair;
- leaf seal means, fixedly attached to and extending from said first end of the other one of each said pair of upstream and downstream wall sections, for slidably bearing against said curved portion to form a substantially air-tight seal therebetween as said upstream and downstream wall sections pivot relative to one another;
- plenum means, defined at least in part by said leaf seal means and said first end of said other of the upstream and downstream wall sections, for flow communicating said first and said second cooling air flow passages;
- offset bracket means for pivotably connecting each said pair of upstream and downstream wall sections at said respective first ends thereof, and
- wherein said offset bracket means includes at least two brackets each having a base portion, fixedly secured to and spaced from one another on said first end of said other one of the upstream and downstream wall sections, and an arm portion extending from said base portion and having a distal end thereof, said one of the upstream and downstream wall sections being pivotably attached to said distal end of each said arm portion.

25. The engine of claim 24, wherein said leaf seal means includes at least one leaf seal having a root portion, said root portion being fixedly attached to said other one of the upstream and downstream wall sections and extending between said arm portions of said brackets, and a biasing portion cantilevered from a distal end of said root portion, said biasing portion being configured along at least a portion thereof to conform to and slidably bear against said curved portion as said upstream and downstream wall sections pivot relative to one another.

26. The engine of claim 19, wherein said curved portion of said one of the upstream and downstream wall sections includes at least two notched portions spaced from one another to correspond to said arm portions of each said arm at least two brackets, said arm portions being movable into and out of said notched portions as said upstream and downstream wall sections pivot relative to one another about said offset bracket means.

27. The engine of claim 26, wherein said leaf seal means includes appendages attached to a distal end of said cantilevered portion of said at least one leaf seal to bridge said notch portions of said curved portion and seal said plenum means as said first and second wall sections pivot about said offset bracket means to progressively larger angles therebetween.

* * * * *